April 17, 1928.
G. W. POBANZ
1,666,789
BELT APPLYING TOOL
Filed Feb. 21, 1927
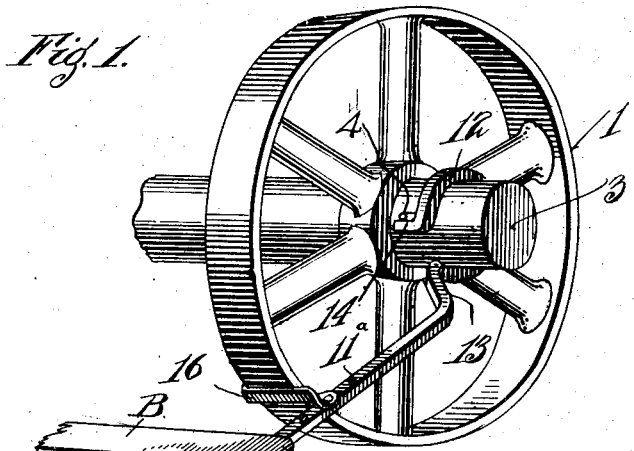
Fig. 1.
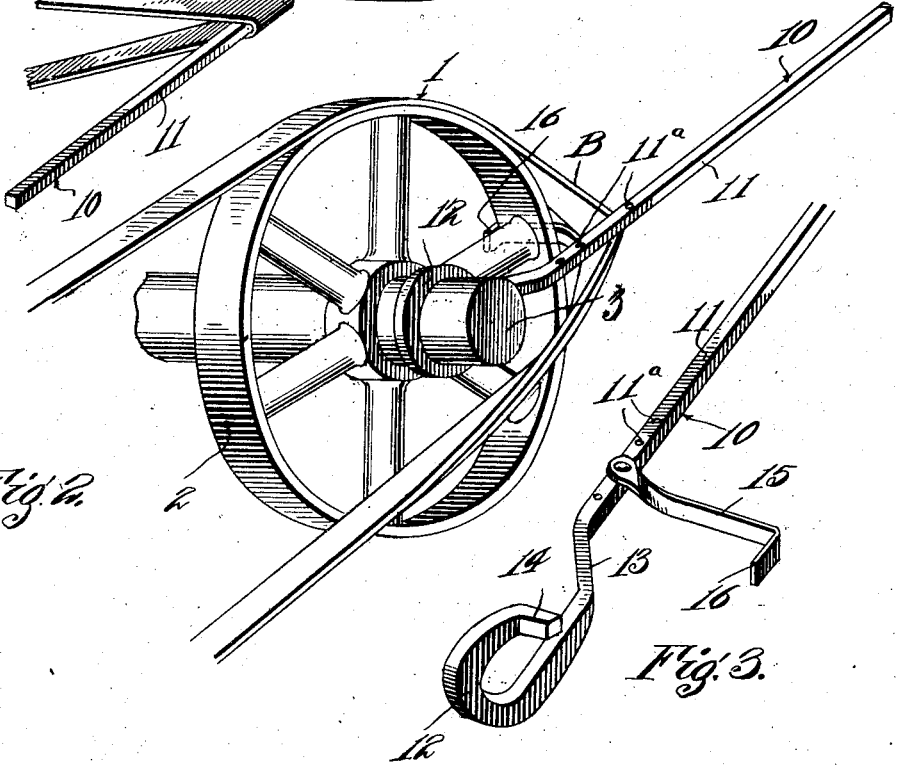
Fig. 2.
Fig. 3.
WITNESSES
INVENTOR
Geo. W. Pobanz.
BY
ATTORNEY Patented Apr. 17, 1928.

1,666,789

UNITED STATES PATENT OFFICE.

GEORGE W. POBANZ, OF GENESEO, ILLINOIS.

BELT-APPLYING TOOL.

Application filed February 21, 1927. Serial No. 170,026.

This invention relates to a simple and efficient tool for applying a belt to a pulley mechanically.

A primary object of the invention is to provide a tool of this character whereby one person is enabled with its aid to engage a belt with a pulley and which is particularly useful in applying heavy belts and those which engage the pulley at high tension.

Another object of the invention is to so construct a tool of this character that it will be strong and cheap to manufacture and being composed of two parts only, one of which is adjustably connected with the other to adapt the tool for use on pulleys of different sizes.

In carrying out these objects, the invention is susceptible of modification without departing from the spirit or sacrificing any of the advantages of the claimed invention; there being shown in the drawings for illustrative purposes a preferred and practical form, in which Figure 1 represents a perspective view of a pulley with this improved tool shown in the act of applying a belt, Fig. 2 is a similar view with the tool shown completing a half revolution illustrating the manner in which the belt engages the pulley in the operation; and Fig. 3 is a detail perspective view of the tool detached.

In the embodiment illustrated a belt pulley 1 of ordinary construction is shown having the usual rim 2 and fixedly mounted on a shaft 3 provided with a lug bolt 4. The tool 10 comprising the invention consists of a heavy metal bar 11 of suitable length and weight according to the belt in connection with which the tool is to be employed. An open loop or eye 12 is formed at one end of a lever or bar 11 being off-set laterally therefrom as shown at 13. This eye or loop is designed to encircle the pulley shaft 3 and has a finger 14 extending laterally from its inner end in a direction opposite to the off-set 13 which is designed to engage a lug bolt 4 carried by the shaft, as is shown clearly in Fig. 1, so that on the turning of lever 11 the pulley will turn with it.

A pulley rim engaging arm 15 is pivotally mounted at one end on the lever 11 by means of a bolt passed through one of a series of apertures 11ª formed in said lever and by means of which said arm may be adjusted on the lever to adapt it for use in connection with pulleys of different sizes. A laterally extending finger 16 is formed at the free end of the arm 15 and is designed to extend around one edge of the pulley rim as is shown clearly in Fig. 2 and hold the implement engaged with the pulley.

From the above description, it will be obvious that this tool being composed of two parts only, is very strong as well as economical to manufacture and is applied in the following manner, to wit: The eye 12 is passed over the end of the pulley shaft 3 with the finger 14 engaged with the lug bolt 4, the off-set 13 operating to space the lever 11 a sufficient distance to position it adjacent one side edge of the pulley rim in which position the arm 15 is swung over said rim and the finger 16 thereof engaged with the rim edge as is shown clearly in Figs. 1 and 2. The belt B is then passed over the lever 11 as shown in Fig. 1 and the lever swung carrying with it the belt, pulley and shaft causing the belt to ride onto the pulley as shown in Fig. 2 in which position the lever has been turned a one-half revolution. The completion of the revolution guides the belt on the pulley and the lever will then be located between the upper and lower stretches of the belt and may be readily disengaged from the pulley shaft.

From the above, it will be seen that this simple easily applied tool may be readily used by a single person for applying heavy belts and where the belt engages the pulley at high tension.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. A tool of the class described comprising a lever having pulley shaft engaging means and a finger to engage a lug on said shaft, and an arm pivoted to said lever and having a rim engaging finger.

2. A tool of the class described comprising a lever having pulley shaft engaging means and a finger to engage a lug on said shaft, an arm adjustably mounted on said lever and having rim engaging means whereby turning of the lever will operate the pulley in connection with which it is used to facilitate the application of the belt.

3. A tool of the class described comprising a lever having a pulley shaft encircling open loop at one end with a finger extending laterally outward from the free end of said loop and adapted for engagement with a lug bolt on a pulley shaft, and an arm pivoted to said lever and having a rim engaging finger.

4. A tool of the character described comprising a lever having an integral laterally off-set open loop at one end said loop having means for engagement with the lug bolt of a pulley shaft, said lever having a plurality of longitudinally spaced apertures, and a rim engaging arm adjustably mounted in one of said apertures and provided at its free end with a rim edge engaging finger.

GEORGE W. POBANZ.